(12) United States Patent
Matsuura et al.

(10) Patent No.: US 10,507,714 B2
(45) Date of Patent: Dec. 17, 2019

(54) AUTOMOTIVE SEALING MEMBER

(71) Applicants: Nishikawa Rubber Co., Ltd., Hiroshima (JP); HONDA MOTOR CO., LTD., Tokyo (JP)

(72) Inventors: Toshifumi Matsuura, Hiroshima (JP); Akiyoshi Kubota, Hiroshima (JP); Toyohisa Amagai, Saitama (JP); Takayuki Doi, Saitama (JP); Masato Saito, Saitama (JP)

(73) Assignees: Nishikawa Rubber Co., Ltd., Hiroshima (JP); HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 16/027,308

(22) Filed: Jul. 4, 2018

(65) Prior Publication Data

US 2019/0016203 A1    Jan. 17, 2019

(30) Foreign Application Priority Data

Jul. 11, 2017   (JP) .................. 2017-135682

(51) Int. Cl.
*B60J 10/15*  (2016.01)
*B60J 10/33*  (2016.01)
*B60J 10/84*  (2016.01)

(52) U.S. Cl.
CPC .............. *B60J 10/15* (2016.02); *B60J 10/33* (2016.02); *B60J 10/84* (2016.02)

(58) Field of Classification Search
CPC ............. B60J 10/15; B60J 10/16; B60J 10/33
See application file for complete search history.

(56) References Cited

U.S. PATENT DOCUMENTS

| 4,447,065 | A | * | 5/1984 | Dupuy | B60J 10/24 |
| | | | | | 277/642 |
| 4,745,016 | A | * | 5/1988 | Hashimoto | B60J 10/24 |
| | | | | | 428/122 |
| 4,949,524 | A | * | 8/1990 | Martin | B60J 10/24 |
| | | | | | 49/490.1 |
| 5,054,241 | A | * | 10/1991 | Mishima | E06B 7/2312 |
| | | | | | 49/490.1 |
| 5,622,008 | A | * | 4/1997 | King | E06B 7/2309 |
| | | | | | 49/490.1 |

(Continued)

FOREIGN PATENT DOCUMENTS

| EP | 0628453 A1 * | 12/1994 | ............ B60R 13/04 |
| EP | 0653332 A1 * | 5/1995 | ............ B60J 10/24 |
| JP | 2008-006858 A | 1/2008 | |

*Primary Examiner* — Catherine A Kelly
(74) *Attorney, Agent, or Firm* — Renner, Otto, Boisselle and Sklar, LLP (57) ABSTRACT

The present disclosure can reduce a force required for the attachment of a sealing member to a flange of a body of an automobile, thereby facilitating the attachment, and can reduce the separation of the attached sealing member from the flange to ensure good seal.

An outer foam 25 which comes into contact with an exterior face of a flange 110 facing the outside of a cabin is provided for an inner face of an outer wall 20. A flexible seal lip 21*a* is provided for an inner face of an inner wall 21. A bottom foam 26 bulges from an inner face of a bottom wall 22. A distance between the outer and bottom foams 25 and 26 in a width direction of the automobile is smaller than a thickness of a thinnest portion of the flange 110.

6 Claims, 5 Drawing Sheets

(56) References Cited

U.S. PATENT DOCUMENTS

| | | | | |
|---|---|---|---|---|
| 6,739,094 | B1 * | 5/2004 | Berry | B60J 10/24 49/478.1 |
| 6,837,005 | B2 * | 1/2005 | Arata | B60J 10/16 296/146.9 |
| 6,874,281 | B2 * | 4/2005 | Fujita | B60J 10/24 296/146.9 |
| 7,735,263 | B2 * | 6/2010 | Oba | B60J 10/24 49/490.1 |
| 8,893,438 | B2 * | 11/2014 | Hamada | B60J 10/80 49/490.1 |
| 9,738,146 | B2 * | 8/2017 | Daio | B60J 10/25 |
| 10,315,349 | B2 * | 6/2019 | Krueger | B60J 10/78 |
| 2005/0022454 | A1 * | 2/2005 | Aida | B60J 10/24 49/490.1 |
| 2008/0295414 | A1 * | 12/2008 | Miyakawa | B60J 10/24 49/490.1 |
| 2009/0266000 | A1 * | 10/2009 | Minoura | B60J 10/24 49/490.1 |

* cited by examiner

AUTOMOTIVE SEALING MEMBER

CROSS-REFERENCE TO RELATED APPLICATION

This application claims priority to Japanese Patent Application No. 2017-135682 filed on Jul. 11, 2017, the entire disclosure of which is incorporated by reference herein.

BACKGROUND

The present disclosure relates to an automotive sealing member arranged at an opening of an automobile to be covered or uncovered with a door of the automobile, particularly to a structure to be attached to a flange formed at the perimeter of the opening.

A body of an automobile generally has an opening through which a passenger gets in and out of the automobile. The opening is covered or uncovered with a door. A flange comprised of an outer panel and an inner panel joined and bonded together is provided along the perimeter of the opening of the body. A sealing member called a weather strip is attached to the flange. When the weather strip makes contact with the perimeter of the closed door, a gap between the perimeter of the door and the perimeter of the opening is sealed (see, e.g., Japanese Unexamined Patent Publication No. 2008-6858).

According to Japanese Unexamined Patent Publication No. 2008-6858, the weather strip includes a mount base in which a core having a substantially U-shaped cross section is embedded, and a hollow sealing portion integrated with an outer side of the mount base facing the outside of a cabin. The mount base includes an outer wall facing the outside of the cabin, an inner wall facing the inside of the cabin, and a bottom wall connecting these walls. The inner wall is provided with a seal lip extending toward the outer wall. When the mount base is attached to the flange of the body, the seal lip of the inner wall makes contact with the flange to sandwich the flange between the seal lip and an inner face of the outer wall. The mount base further includes a sponge seal which is made of an elastic material and comes into contact with a tip end of the flange. The sponge seal is provided at the corner formed by the outer wall and the bottom wall.

SUMMARY

Due to the growing demand for cabin quietness, various configurations of the automotive sealing member have been proposed to block external noise from coming into the cabin through the opening of the body. Japanese Unexamined Patent Publication No. 2008-6858 discloses an example of such configurations. In this example, the sponge seal is provided inside the mount base so that the tip end of the flange of the body comes into contact with the sponge seal when the mount base is attached to the flange. The contact between the tip end of the flange and the sponge seal creates almost no gap between them. Thus, even if noise comes into the mount base from outside the cabin, the noise does not easily reach the inside of the cabin, which can improve the cabin quietness.

However, this configuration of Japanese Unexamined Patent Publication No. 2008-6858 may lead to possible disadvantages in an attachment process as described below. Specifically, the sponge seal is provided at the corner formed by the outer wall and the bottom wall, i.e., shifted toward the outside of the cabin within the base mount. Further, the flange of the body, sandwiched between the seal lip on the inner wall and the outer wall, is relatively shifted toward the outside of the cabin. That is, both of the sponge seal and the flange of the body are relatively shifted toward the outside of the cabin within the mount base, which allows the tip end of the flange to make contact with the sponge seal inside the mount base. However, this means that when the mount base is approaching the flange of the body during the attachment process, the tip end of the flange starts to make contact with the sponge seal before the attachment is completed, and a reaction force is applied from the sponge seal to the tip end of the flange in a direction opposite to the approaching direction. This increases a force required for the attachment of the flange, raising concerns about decrease in workability. In particular, this problem occurs remarkably because the sealing member to be attached to the flange of the opening of the automobile may sometimes be as long as several meters.

After the attachment of the sealing member has been completed, the reaction force applied from the sponge seal to the tip end of the flange of the body always presses the tip end of the flange in a direction opposite to the approaching direction, i.e., a direction in which the mount base is separated from the tip end of the flange. Receiving such a reaction force, the sealing member does not entirely come off the flange, but may partially be detached from the flange in a circumferential direction. This may impair the seal.

In view of the foregoing, it is an object of the present disclosure to reduce a force required for the attachment of a sealing member to a flange of a body of an automobile, thereby facilitating the attachment, and to reduce the separation of the attached sealing member from the flange to ensure good seal.

To achieve the object, according to the present disclosure, an outer foam is provided for an inner face of an outer wall of a mount base, a bottom foam is provided for an inner face of a bottom wall of the mount base, and a gap formed between the outer and bottom foams is made smaller than a thickness of a thinnest portion of the flange.

A first aspect of the present disclosure is directed to an automotive sealing member including: a mount base to be attached to a flange formed along a perimeter of an opening provided for a body of an automobile, the sealing member sealing a gap between the perimeter of the opening and an opening/closing member for covering or uncovering the opening. The mount base includes an outer wall to be arranged further toward the outside of a cabin than the flange, an inner wall to be arranged further toward the inside of the cabin than the flange, and a bottom wall connecting the outer and inner walls together, an end of the outer wall and an end of the inner wall, which are opposite to the bottom wall, forming a space therebetween which is open to allow the mount base to be attached to the flange through a tip end of the flange. A protrusion and an outer foam are provided for an inner face of the outer wall facing the inside of the mount base, the protrusion coming into contact with an exterior face of the flange facing the outside of the cabin, the outer foam being made of an elastic foaming material and coming into contact with the exterior face of the flange. A flexible seal lip is provided for an inner face of the inner wall facing the inside of the mount base, the flexible seal lip extending toward the outer wall, further approaching the bottom wall as it goes toward a tip end thereof, and coming into contact with an interior face of the flange facing the inside of the cabin. A bottom foam is provided for an inner face of the bottom wall facing the inside of the mount base, the bottom foam being made of an elastic foaming material, being spaced from the outer foam toward the inside of the cabin, and bulging toward the space. A distance between the outer foam and the bottom foam in a width direction of the automobile is smaller than a thickness of a thinnest portion of the flange.

In this configuration, when the mount base is attached to the flange of the body through the space between the outer and inner walls of the mount base, the seal lip is warped upon contact with the interior face of the flange, and applies a reaction force to the mount base. As a result, the protrusion of the outer wall is pressed against the exterior face of the flange. In this state, the outer foam on the outer wall comes into contact with the exterior face of the flange. Thus, the gap between the exterior face of the flange and the outer wall of the mount base is sealed by the outer foam, and the noise entering the cabin from outside can be blocked. Further, a distance between the outer foam and the bottom foam in the width direction of the automobile is smaller than the thickness of the thinnest portion of the flange. Thus, the bottom foam makes contact with the tip end of the flange to seal a gap between the tip end of the flange and the bottom wall of the mount base. This can also block the noise entering the cabin from outside. As a result, cabin quietness improves.

When the sealing member is attached to the flange, the outer foam comes into contact, not with the tip end of the flange, but with the exterior face of the flange. Thus, the reaction force applied to the flange in a direction opposite to the direction of attachment becomes smaller than that caused by a generally-known sponge seal. Further, the bottom foam comes into contact with the tip end of the flange. Since the bottom foam is spaced from the outer foam toward the inside of the cabin, the reaction force applied to the flange in the direction opposite to the direction of attachment can be reduced. The seal ensured by the outer foam means that the area of contact between the bottom foam and the tip end of the flange can be reduced. This can also reduce the reaction force applied to the flange in the direction opposite to the direction of attachment. Thus, a force required for the attachment of the sealing member to the flange of the body of the automobile can be reduced, and the separation of the attached sealing member from the flange can be reduced.

A second aspect of the present disclosure is an embodiment of the first aspect of the present disclosure. In the second aspect, the outer foam is arranged closer to the bottom wall than the protrusion on the inner face of the outer wall and the tip end of the seal lip which has been warped through the attachment of the mount base to a thickest portion of the flange.

In this configuration, the seal lip which has been warped upon contact with the interior face of the flange generates a reaction force that draws the whole mount base toward the inside of the cabin. In this state, a region of the mount base with the protrusion abuts on the exterior face of the flange to support the mount base. This generates a force that draws a region of the mount base with the elastically deformable outer foam toward the inside of the cabin, i.e., a force that rotates the mount base about the protrusion which is closer to the tip end of the flange, and functions as a fulcrum. Specifically, the outer foam comes into contact with the exterior face of the flange closer to the bottom wall and applies a greater force pressing the exterior face toward the inside of the cabin. This can improve the seal between the exterior face of the flange and the outer foam.

A third aspect of the present disclosure is an embodiment of the first aspect of the present disclosure. In the third aspect, the outer foam is arranged closer to a base end of the flange than to the tip end of the flange to which the mount base has been attached.

In this configuration, the outer foam is positioned closer to the base end of the flange than to the tip end thereof. This allows the outer foam to make contact with the exterior face of the flange with reliability.

A fourth aspect of the present disclosure is an embodiment of the first aspect of the present disclosure. In the fourth aspect, an outer end of the bottom foam toward the outside of the cabin is positioned further toward the outside of the cabin than the interior face of the flange.

This allows the bottom foam to come into contact with the tip end of the flange with reliability.

A fifth aspect of the present disclosure is an embodiment of the first aspect of the present disclosure. In the fifth aspect, a face of the outer foam toward the space is configured to further approach the bottom wall with approaching the inside of the cabin.

In this configuration, when the mount base is attached to the flange through the space, the tip end of the flange is not easily hooked on the face of the outer foam facing the space. This can protect the outer foam from damage caused by the tip end of the flange being hooked on the outer foam.

A sixth aspect of the present disclosure is an embodiment of the first aspect of the present disclosure. In the sixth aspect, the bottom foam decreases in height from the inner face of the bottom wall with approaching from an intermediate vertex of the bottom foam in the width direction of the automobile to the inside of the cabin.

In this configuration, when the mount base is attached to the thickest portion of the flange and the seal lip is warped, the tip end of the seal lip does not easily interfere with the bottom foam.

According to the first aspect, the outer foam which comes into contact with the exterior face of the flange is arranged on the inner face of the outer wall of the mount base, the bottom foam is arranged on the inner face of the bottom wall, and the gap between the outer foam and the bottom foam is made smaller than the thickness of the thinnest portion of the flange. Thus, a force required for the attachment of the sealing member to the flange of the body of the automobile can be reduced, thereby facilitating the attachment. Further, the separation of the attached sealing member from the flange can be reduced, thereby ensuring good seal.

According to the second aspect, the outer foam is arranged to be closer to the bottom wall than the protrusion and the tip end of the seal lip that has been warped through the attachment of the mount base to the thickest portion of the flange. Thus, the outer foam can be brought into contact with the exterior face of the flange with reliability to further ensure the seal.

According to the third aspect, the outer foam, which is arranged closer to the base end of the flange than to the tip end thereof, can be brought into contact with the exterior face of the flange with reliability. This can further ensure the seal.

According to the fourth aspect, the outer end of the bottom foam is positioned further outside than the interior face of the flange. Thus, the bottom foam can be brought into contact with the tip end of the flange with reliability. This can further ensure the seal.

According to the fifth aspect, the face of the outer foam facing the space is configured to further approach the bottom wall with approaching the inside of the cabin. Thus, when the mount base is attached to the flange through the space, the tip end of the flange is not easily hooked on the face of the outer foam facing the space. This can protect the outer foam from damage.

According to the sixth aspect, the bottom foam decreases in height from the inner face of the bottom wall with approaching from an intermediate vertex of the bottom foam in the width direction of the automobile to the inside of the cabin. Thus, when the seal lip is warped, the tip end of the seal lip does not easily interfere with the bottom foam, which can facilitate the attachment of the sealing member.

DETAILED DESCRIPTION

Embodiments of the present disclosure will be described in detail with reference to the drawings. The following description of advantageous embodiments is only an example in nature, and is not intended to limit the scope, applications, or use of the present disclosure.

Figure 1:
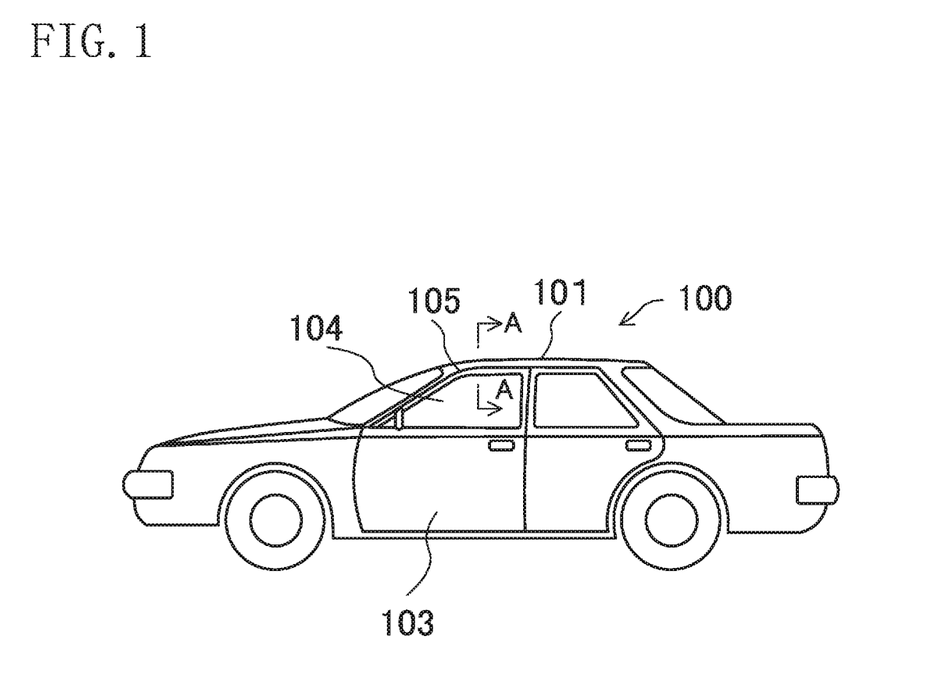
FIG. 1 is a left side view of an automobile provided with an automotive sealing member according to an embodiment of the present disclosure.

FIG. 1 is a left side view of an automobile 100 provided with an automotive sealing member 1 according to an embodiment of the present disclosure. The automobile 100 has, on the right and left sides of a body 101 thereof, openings 102 (indicated by phantom lines in FIG. 2) through which a passenger or baggage gets in or out of the automobile. Each opening 102 is covered or uncovered with a door (opening/closing member) 103 shown in FIG. 1. The door 103 on each side of the body 101 includes a front door and a rear door, which are different in shape, but are configured in the same manner. The door 103 has a front end supported on the body 101 via a vertically extending support shaft (not shown), and pivots around the support shaft to cover or uncover the opening 102. The door 103 configured to pivot around the support shaft may be configured in different ways. For example, the door 103 may be a sliding door which slides in a longitudinal direction of the automobile (will be hereinafter simply referred to as a "longitudinal direction") to cover or uncover the opening 102. In the description of this embodiment, the front and rear sides of the automobile may be simply referred to as the "front" and the "rear," and the left and right sides of the automobile may be simply referred to as the "left" and the "right."

Figure 2:
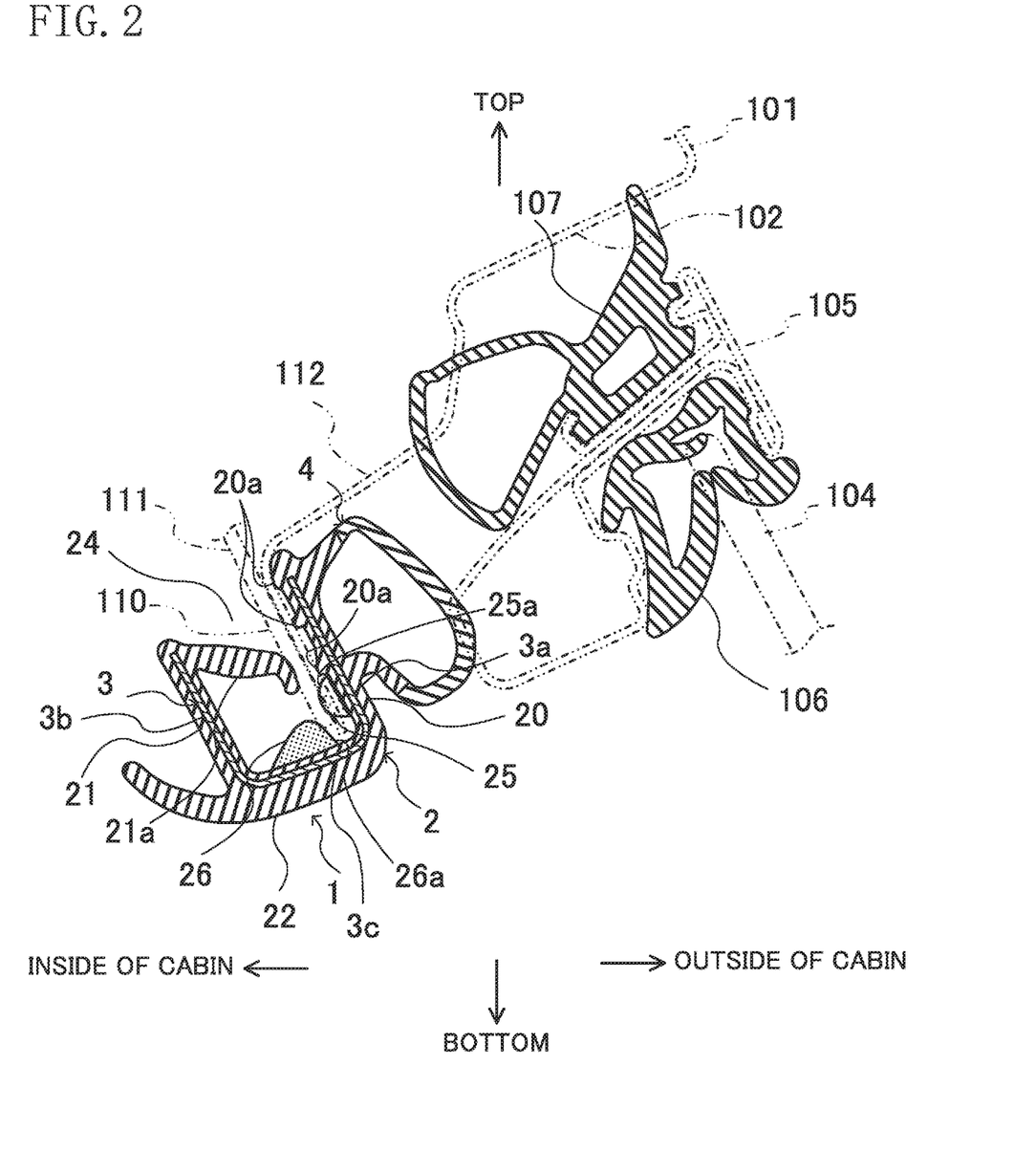
FIG. 2 is a cross-sectional view taken along line A-A of FIG. 1.

A window glass 104 which is able to move up and down is disposed in an upper portion of the door 103. Further, a sash 105 in the form of a frame is provided in the upper portion of the door 103 to hold the perimeter of the window glass 104. As shown in FIG. 2, a glass run 106 configured to make contact with the perimeter of the window glass 104 is provided on an inner peripheral side of the sash 105. The glass run 106 seals a gap between the perimeter of the window glass 104 and the inner peripheral side of the sash 105. A door sealing member 107 is provided on an outer peripheral side of the sash 105. The door sealing member 107 makes contact with the perimeter of the opening 102 of the body 101. The door sealing member 107 seals a gap between the perimeter of the opening 102 and the outer peripheral side of the sash 105.

Figure 3:
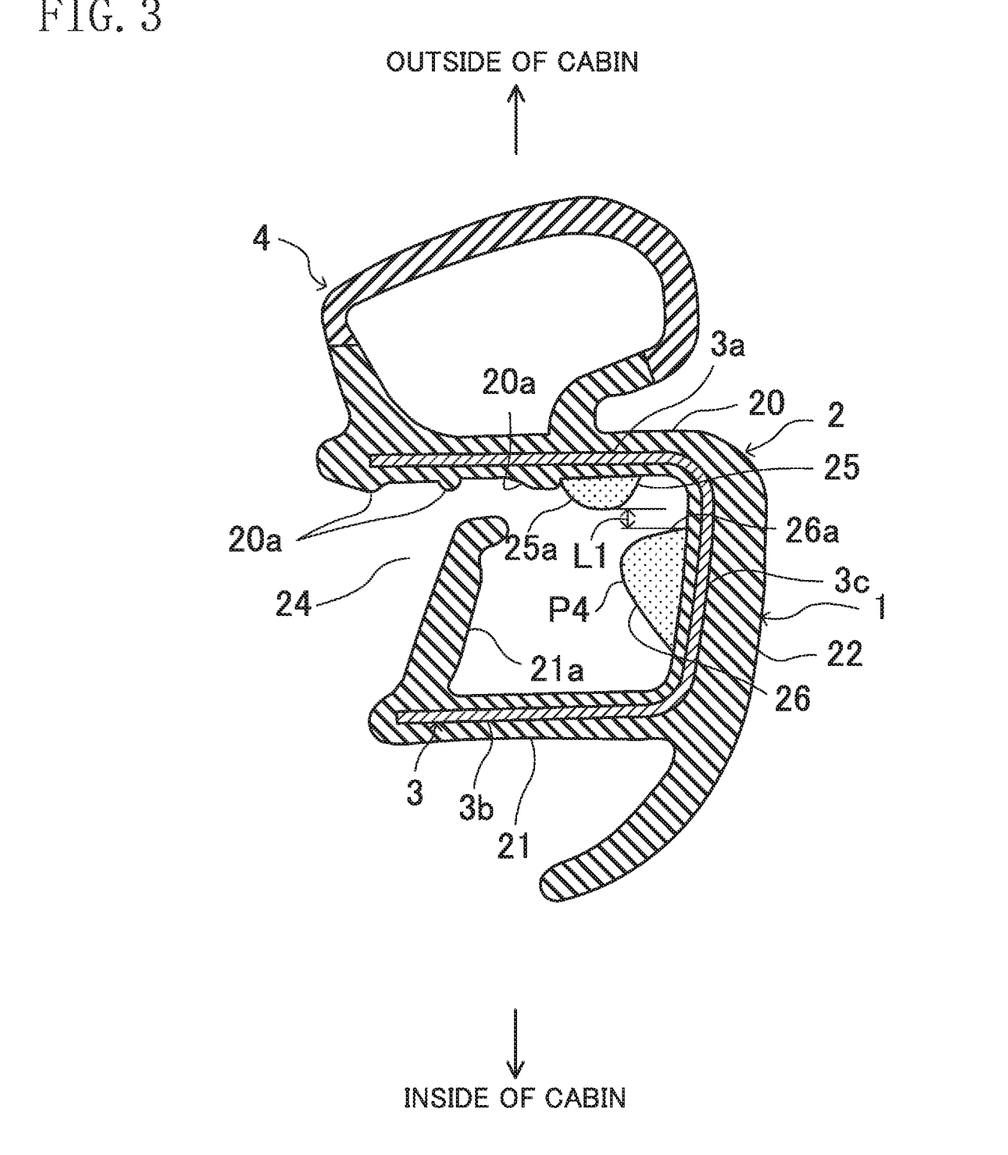
FIG. 3 is a cross-sectional view of the automotive sealing member not attached to a flange yet.
Figure 4:
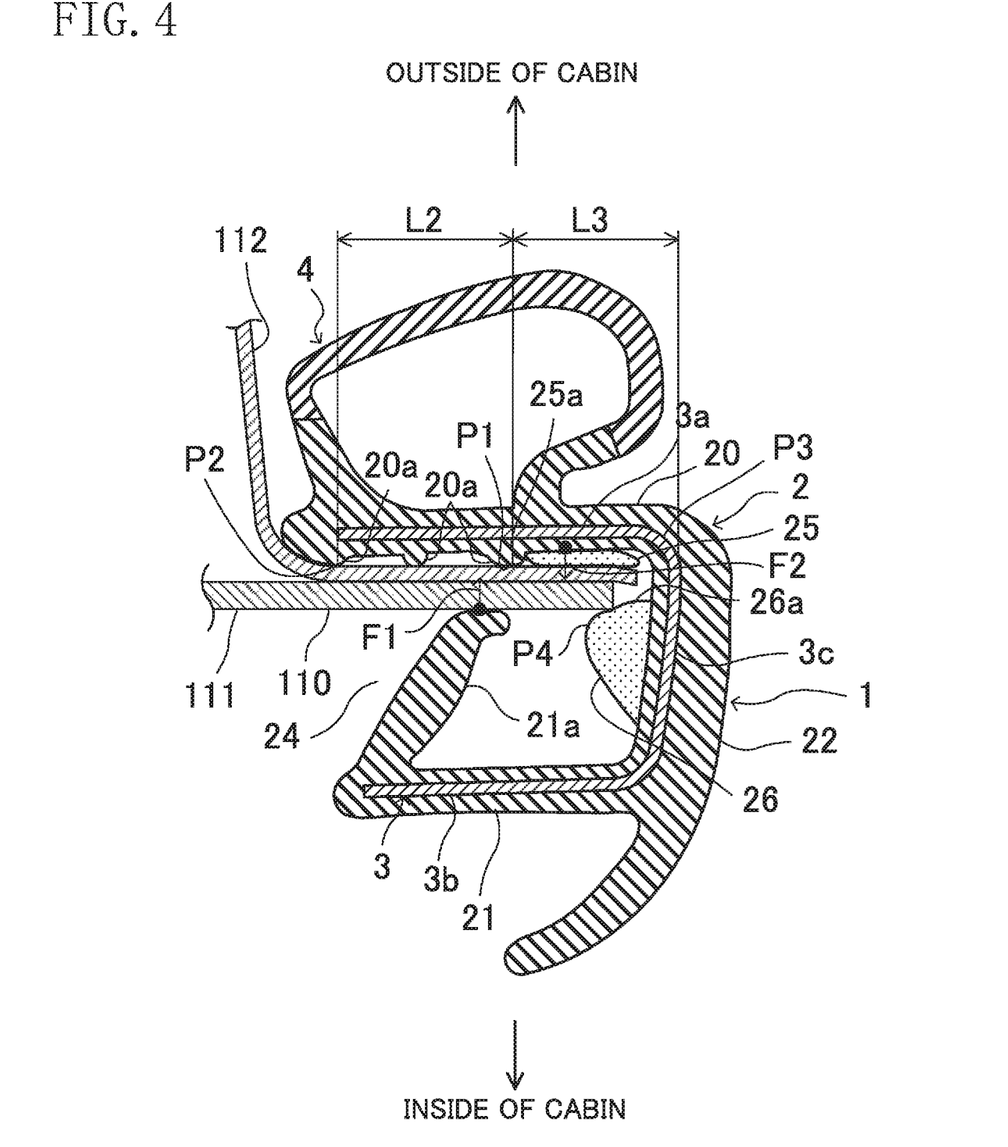
FIG. 4 is a view corresponding to FIG. 3, illustrating a mount base attached to a thinnest portion of the flange.
Figure 5:
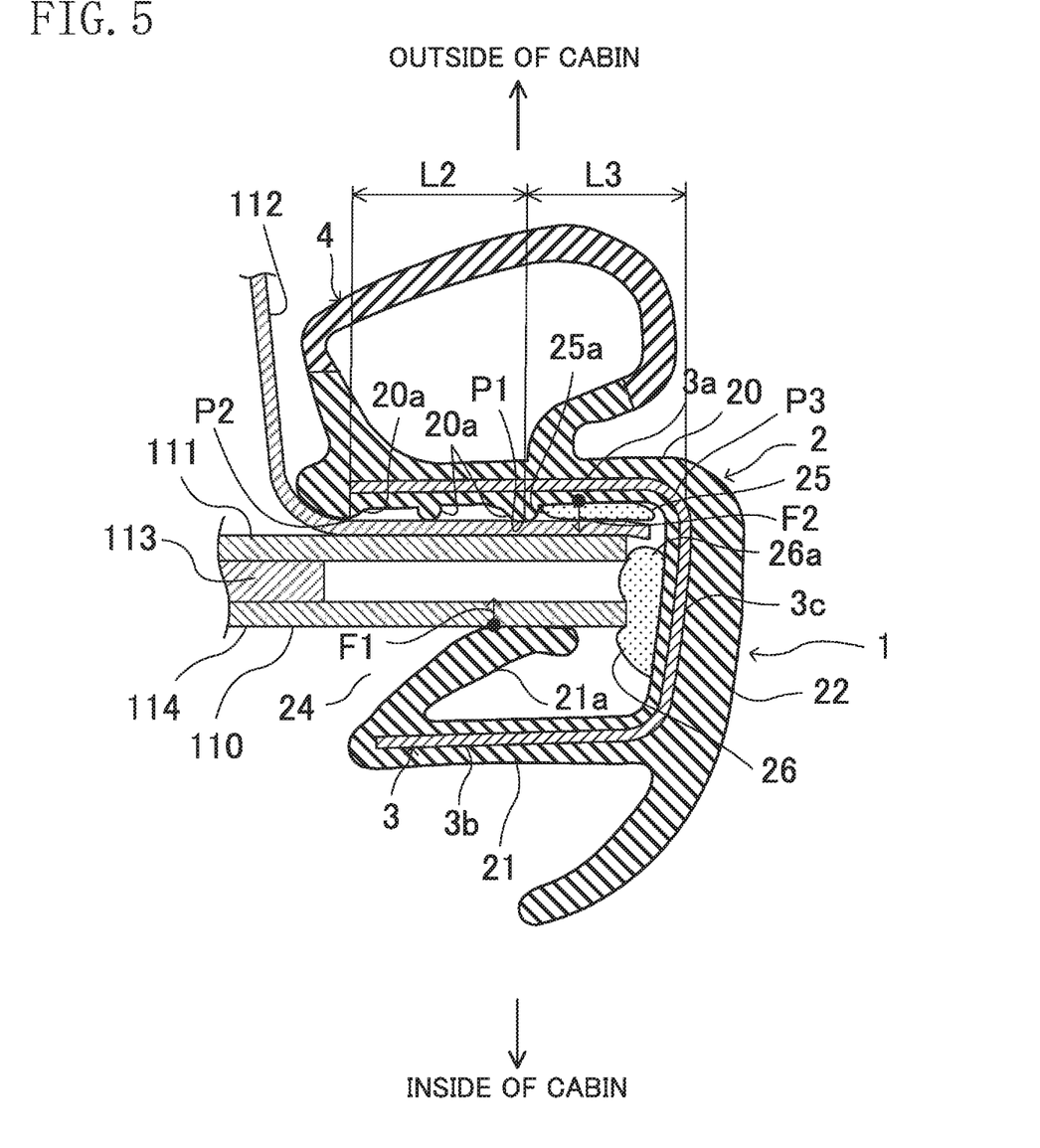
FIG. 5 is a view corresponding to FIG. 3, illustrating a mount base attached to a thickest portion of the flange.

A flange 110 is provided along the perimeter of the opening 102 of the body 101. The flange 110 extends continuously along the whole perimeter of the opening 102, and protrudes toward the center of the opening 102. The flange 110 includes at least a thinnest portion comprised of an inner panel 111 and an outer panel 112 stacked together in a thickness direction as shown in FIGS. 2 and 4, and a thickest portion comprised of the inner panel 111, the outer panel 112, a first panel 113, and a second panel 114 stacked together in the thickness direction as shown in FIG. 5. In FIGS. 3 to 5, the sealing member 1 is oriented differently from the sealing member 1 shown in FIG. 2 for the sake of easy description. When attached, the sealing member 1 is oriented as shown in FIG. 2. FIG. 2 shows a portion of the sealing member 1 corresponding to a roof of the automobile. Other portions of the sealing member 1, such as portions corresponding to a side sill, a pillar, and a hinge, basically have the same cross-sectional shape.

The thinnest portion of the flange 110 shown in FIG. 4 is provided for the roof of the body 101, and has a length corresponding to about 40% of the whole circumference of the opening 102. The thinnest portion of the flange 110 has a thickness of about 1.0 mm to 1.5 mm. The thickest portion of the flange 110 shown in FIG. 5 is provided for a portion of the perimeter of the opening 102 to which the support shaft of the door 103 is attached, i.e., a portion between the hinge and the side sill, and has a length corresponding to about 10% of the whole circumference of the opening 102. The thickest portion of the flange 110 has a thickness of about 5.5 mm to 5.7 mm. Thus, the thickest portion of the flange 110 is about four to six times thicker than the thinnest portion. The present disclosure is suitably adapted to the case where the flange 110 has portions that greatly differ in thickness.

The rest of the flange 110 except for the thinnest and thickest portions has an intermediate thickness between the thicknesses of the thinnest and thickest portions, and has a length corresponding to about 50% of the whole circumference of the opening 102. Although not shown, the intermediate thickness portion of the flange 110 may include an additional panel stacked together with the inner and outer panels 111 and 112.

As shown in FIGS. 4 and 5, the inner panel 111 is made of a plate thicker than the outer panel 112. The outer panel 112 has a tip end protruding further toward the center of the opening 102 than the tip end of the inner panel 111, and is bent toward the inside of the cabin. As shown in FIG. 5, in the thickest portion of the flange 110, the first panel 113 is stacked on the inner panel 111, and the second panel 114 is stacked on the first panel 113. In this embodiment, the first panel 113 is the thickest panel. The thicknesses of the first and second panels 113 and 114 may be determined as appropriate. The tip end of the first panel 113 is located further toward its base end than the tip ends of the inner panel 111, the outer panel 112, and the second panel 114. Thus, a gap is formed between the inner panel 111 and the second panel 114.

Depending on the portions of the automobile, the gap between the inner panel 111 and the second panel 114 is formed without the presence of the first panel (not shown). If the panels comprising the flange 110 are spot-welded, the gap between the panels is formed between the welded points (not shown).

(General Configuration of Sealing Member 1)

As shown in FIG. 2 and other drawings, the sealing member 1 includes a mount base 2 attached to the flange 110 of the body 101, a core 3 embedded in the mount base 2, and a hollow sealing portion 4. The sealing member 1 seals a gap between the perimeter of the opening 102 of the body 101 and the door 103 which covers or uncovers the opening 102, and may be called an "opening seal" or a "weather strip." The sealing member 1 is an annular member extending along the flange 110 of the body 101. The sealing member 1 is attached to the flange 110 via the mount base 2 along the whole circumference thereof.

The mount base 2 and the hollow sealing portion 4 may be made of an elastic material, for example, ethylene-propylene-diene rubber (EPDM), and olefin-based thermoplastic elastomer (TPO). The EPDM and TPO may be foamed materials, or solid materials. The core 3 may be made of, for example, a metallic material or a rigid resin. Examples of the metallic material include, for example, an SPCC steel sheet (a cold rolled steel sheet) and a galvanized steel sheet. The rigid resin may be blended with a filler such as talc, for example.

The mount base 2, the core 3, and the hollow sealing portion 4 are integrated into a single piece, and can be extrusion molded, for example. An outer foam 25 and a bottom foam 26, which will be described later, can be integrally molded with the mount base 2 during the extrusion molding of the mount base 2. Alternatively, the foams 25 and 26 may be molded separately, and then integrated with the mount base 2.

(Configuration of Hollow Sealing Portion 4)

The hollow sealing portion 4 is provided on an outer side of the mount base 2 toward the outside of the cabin. The hollow sealing portion 4 has a hollow space therein, and has an elastically deformable peripheral wall. When the door 103 covers the opening 102, an inner side of the door 103 facing the inside of the cabin comes into contact with an outer side of the hollow sealing portion 4. Then, the hollow sealing portion 4 is elastically deformed toward the inside of the cabin to be in close contact with the perimeter of the door 103, thereby sealing the gap between them.

(Configuration of Mount Base 2)

The mount base 2 has an outer wall 20 to be arranged further toward the outside of the cabin than the flange 110 of the body 101, an inner wall 21 to be arranged further toward the inside of the cabin than the flange 110, and a bottom wall 22 connecting the outer and inner walls 20 and 21 together. The outer wall 20 extends along an exterior face of the flange 110 facing toward the outside of the cabin. The hollow sealing portion 4 is integrated with an outer face of the outer wall 20 facing toward the outside of the cabin.

The inner wall 21 extends substantially parallel with the outer wall 20, and is spaced toward the inside of the cabin from an interior face of the flange 110 facing the inside of the cabin. The bottom wall 22 extends from one of the ends of the outer wall 20 to one of the ends of the inner wall 21. The other end of the outer wall 20 and the other end of the inner wall 21 opposite to the bottom wall 22 form a space 24 therebetween, which is open to allow the mount base to be attached to the flange 110 of the body 101 through a tip end thereof. The space 24 is open along the whole circumference of the sealing member 1. The space 24 has a width significantly larger than the thickness of the thickest portion of the flange 110 of the body 101. The flange 110 of the body 101, to which the mount base 2 has been attached, receives a reaction force from a flexible seal lip 21a (described later), and is shifted relatively toward the outside of the cabin within the mount base 2.

A face of the outer wall 20 facing the inside of the mount base 2 (inner face) is provided with a plurality of protrusions 20a projecting toward the inner wall 21. The protrusions 20a are to be in contact with the exterior face of the flange 110 of the body 101. One of the protrusions 20a is arranged at the end of the inner face of the outer wall 20 opposite to the bottom wall 22, and other protrusions 20a are arranged to be spaced from the end toward the bottom wall 22. The protrusions 20a are arranged to be spaced from each other. The height of the protrusions 20a protruding from the outer wall 20 is set small so that the exterior face of the flange 110 and the inner face of the outer wall 20 approach each other when the tip end of each protrusion 20a makes contact with the exterior face of the flange 110 of the body 101. Since the tip end of each protrusion 20a is allowed to make contact with the exterior face of the flange 110 of the body 101, the relative positional relationship between the exterior face of the flange 110 and the inner face of the outer wall 20 does not greatly change whether the mount base 2 is attached to the thinnest portion of the flat 110 as shown in FIG. 4 or the thickest portion as shown in FIG. 5.

A flexible seal lip 21a is provided for a face of the inner wall 21 facing the inside of the mount base 2 (inner face) to extend toward the outer wall 20. The seal lip 21a has a base end continuous with the end of the inner wall 21 opposite to the bottom wall 22. The seal lip 21a is inclined or curved so as to be closer to the bottom wall 22 as it goes from the base end to the tip end thereof. The seal lip 21a is allowed to come into contact with the interior face of the flange 110 of the body 101. When the mount base 2 is not attached to the flange 110 as shown in FIG. 3, the seal lip 21a receives no external force, and has the original shape as it is extrusion-molded.

The seal lip 21a is warped depending on the thickness of the flange 110 to which the mount base 2 is attached. Specifically, when the mount base 2 is attached to the thinnest portion of the flange 110 as shown in FIG. 4, the seal lip 21a is not greatly warped. Thus, a large distance is created between the interior face of the flange 110 and the inner wall 21 of the mount base 2. On the other hand, when the mount base 2 is attached to the thickest portion of the flange 110 as shown in FIG. 5, the seal lip 21a is greatly warped. Thus, the distance between the interior face of the flange 110 and the inner wall 21 of the mount base 2 becomes smaller than that shown in FIG. 4. That is, the seal lip 21a is configured to be warped upon contact with the interior face of the flange 110 in both of the case where the mount base 2 is attached to the thinnest portion of the flange 110 and the case where the mount base 2 is attached to the thickest portion of the flange 110. Of course, the seal lip 21a is warped upon contact with the interior face of the flange 110 when the mount base 2 is attached to the intermediate thickness portion of the flange 110.

(Configuration of Core 3)

The core 3 enhances the rigidity of the mount base 2. The core 3 has an outer plate 3a to be embedded in the outer wall 20 of the mount base 2, an inner plate 3b to be embedded in the inner wall 21, and a bottom plate 3c to be embedded in the bottom wall 22.

(Configuration of Outer Foam 25 and Bottom Foam 26)

An outer foam 25 made of an elastic foaming material is provided for the inner face of the outer wall 20 to be in contact with the exterior face of the flange 110. The outer foam 25 bulges toward the inner wall 21. A bottom foam 26 made of an elastic foaming material is provided for an inner face of the bottom wall 22 to be spaced from the outer foam 25 toward the inside of the cabin. The bottom foam 26 bulges toward the space 24. The elastic foaming material comprising the outer and bottom foams 25 and 26 may be, for example, a foaming material such as EPDM, and is made of an elastic material softer than the elastic material comprising the outer wall 20 and the bottom wall 22. The elastic foaming material comprising the outer and bottom foams 25 and 26 may have a specific gravity of 0.4 or lower. The lower limit of the specific gravity is not particularly determined as long as the material can be extrusion-molded. The bottom foam 26 has a larger cross-sectional shape than the outer foam 25. The height of the bottom foam 26 bulging from the bottom wall 22 is greater than the height of the outer foam 25 bulging from the outer wall 20.

A distance between the outer and bottom foams 25 and 26 in a width direction of the automobile (will be hereinafter referred to as a "width direction") is smaller than the thickness of the thinnest portion of the flange 110. Specifically, a gap is formed between a top face of the outer foam 25 (a top face toward the inside of the cabin) and an outer end 26a of the bottom foam 26 toward the outside of the cabin. This gap is smaller than the thickness of the thinnest portion of the flange 110. Thus, when the mount base 2 is attached to the thinnest portion of the flange 110 as shown in FIG. 4, the interior face of the flange 110 can be brought into contact with the bottom foam 26.

The outer foam 25 is arranged on the inner face of the outer wall 20 to be closer to the bottom wall 22 than the protrusions 20a. The outer foam 25 is adjacent to the bottom wall 22, but is not in contact with the inner face of the bottom wall 22. Thus, the outer foam 25 is arranged to be closer to the bottom wall 22 than the tip end of the seal lip 21a which has been warped through the attachment of the mount base 2 to the thickest portion of the flange 110 as shown in FIG. 5.

The outer and bottom foams 25 and 26 are spaced from each other as shown in FIGS. 4 and 5, and thus, have a distance L1 therebetween. The distance L1, serving as a small space, does not allow the outer and bottom foams 25 and 26 to come into contact with each other even if the outer foam 25 is deformed toward the tip end of the flange 110, or the bottom foam 26 is deformed toward the outside of the cabin. This does not impair the ease of attachment of the mount base 2.

As shown in FIGS. 4 and 5, the outer foam 25 is arranged closer to the base end of the flange 110 than to the tip end of the flange 110 to which the mount base 2 has been attached. The tip end of the flange 110 to which the mount base 2 has been attached is close to the inner face of the bottom wall 22. With the outer foam 25 arranged closer to the base end of the flange 110 than to the tip end thereof, the outer foam 25 makes contact with the exterior face of the flange 110 with reliability.

Further, the outer end 26a of the bottom foam 26 is positioned further outside of the cabin than the interior face of the flange 110. This allows the outer end 26a of the bottom foam 26 to come into contact with the tip end of the thinnest portion of the flange 110 with reliability.

The outer foam 25 has a face 25a toward the space 24 which is curved or tilted to further approach the bottom wall 22 with approaching the inside of the cabin. The bottom foam 26 decreases in height from the inner face of the bottom wall 26 with approaching the inside of the cabin. Further, the bottom foam 26 decreases in height from the inner face of the bottom wall 26 with approaching the outside of the cabin. Thus, the outer face of the bottom foam 26 has an intermediate vertex P4 so that the middle portion of the bottom foam 26 in the width direction is the closest to the space 24.

(Advantages of Embodiment)

When the mount base 2 is attached to the flange 110 of the body 101 through the space 24 between the outer and inner walls 20 and 21 of the mount base 2 of the sealing member 1, the seal lip 21a is warped upon contact with the interior face of the flange 110, and applies a reaction force to the mount base 2. As a result, the protrusions 20a of the outer wall 20 are pressed onto the flange 110. Thus, the flange 110 is sandwiched between the protrusions 20a on the outer wall 20 and the seal lip 21a on the inner wall 21 to be relatively shifted toward the outside of the cabin within the mount base 2.

In this state, the outer foam 25 on the outer wall 20 comes into contact with the exterior face of the flange 110, thereby sealing the gap between the exterior face of the flange 110 and the outer wall 20 of the mount base 2. This can block the noise from entering the cabin from outside. Further, the distance between the outer and bottom foams 25 and 26 in the width direction is smaller than the thickness of the thinnest portion of the flange 110. Thus, when the mount base 2 is attached to the thinnest portion of the flange 110 as shown in FIG. 4, the tip end of the flange 110 comes into contact with the outer face of the bottom foam 26 facing the outside of the cabin. In this state, the tip end of the flange 110 and the bottom foam 26 come into contact with each other, which seals the gap between the tip end of the flange 110 and the bottom wall 22 of the mount base 2. This can also block the noise from entering the cabin from outside. As a result, cabin quietness improves.

Moreover, when the mount base 2 is attached to the thickest portion of the flange 110 as shown in FIG. 5, the middle portion of the bottom foam 26 in the width direction comes into contact with the tip end of an interior portion (the tip end of the inner panel 111) of the flange 110. Thus, the gap between the tip end of the flange 110 and the bottom wall 22 of the mount base 2 is sealed by the bottom foam 26.

When the sealing member 1 is attached to the flange 110, the outer foam 25 of the sealing member 1 comes into contact, not with the tip end of the flange 110, but with the exterior face of the flange 110. Thus, the reaction force applied to the flange 110 in a direction opposite to the direction of attachment becomes smaller than that caused by a generally-known sponge seal.

Further, the bottom foam 26 comes into contact with the tip end of the flange 110. Since the bottom foam 26 is spaced from the outer foam 25 toward the inside of the cabin, the reaction force applied to the flange 110 in the direction opposite to the direction of attachment can be reduced. The seal ensured by the outer foam 25 means that the area of contact between the bottom foam 26 and the tip end of the flange 110 can be reduced. This can also reduce the reaction force applied to the flange 110 in the direction opposite to the direction of attachment. Thus, a force required for the attachment of the sealing member 1 to the flange 110 of the body 101 can be reduced, and the separation of the attached sealing member 1 from the flange can be reduced.

This can facilitate the attachment of the sealing member 1, and can ensure the seal while reducing the separation of the attached sealing member 1 from the flange.

Depending on the portions of the automobile, the gap between the inner panel 111 and the second panel 114 is formed without the presence of the first panel (not shown). If the panels comprising the flange 110 are spot-welded, the gap between the panels is formed between the welded points (not shown). The noise entering the cabin through such gaps can be controlled because the bottom foam 26 is allowed to make contact with the tip end of the flange 110. In this point of view, the secured seal can be achieved.

Furthermore, the outer foam 25 is arranged to be closer to the bottom wall 22 than the protrusions 20a and the tip end of the seal lip 21a which has been warped through the attachment of the mount base 2 to the thickest portion of the flange 110. Thus, the seal lip 21a which has been warped upon contact with the interior face of the flange 110 generates a reaction force that draws the whole mount base 2 toward the inside of the cabin. In this state, a region of the mount base with the protrusions 20a (a region L2 from point of contact P1 between the flange 110 and the protrusion 20a closer to the tip end of the flange 110 to point of contact P2 between the flange 110 and the protrusion 20a closer to the base end of the flange 110) abuts on the exterior face of the flange 110 to support the mount base 2. This generates a force that draws a region L3 from the point P1 to point P3 which is a center portion of an outer corner R of the core 3 (a region with the elastically deformable outer foam 25) toward the inside of the cabin, i.e., a force that rotates the mount base 2 about the point P1 serving as a fulcrum. Specifically, the outer foam 25 makes contact with the exterior face of the flange 110 closer to the bottom wall 22 and applies a greater force to push the exterior face toward the inside of the cabin. This can improve the seal between the exterior face of the flange 110 and the outer foam 25.

The point P1 is substantially located near the center between the points P2 and P3. This is because the point P1 set to be too close to the point P3 at the center of the corner R is not suitable for the following reasons: the outer foam 25 cannot be provided easily; and the outer foam 25 cannot be pressed sufficiently onto the exterior face of the flange.

Further, the outer foam 25, which is arranged closer to the base end of the flange 110 than to the tip end thereof, can be brought into contact with the exterior face of the flange 110 with reliability. This can further ensure the seal.

The outer end of the bottom foam 26 is positioned further outside than the interior face of the flange 110. Thus, the bottom foam 26 can be brought into contact with the tip end of the flange 110 with reliability. This can further ensure the seal.

Moreover, the face 25a of the outer foam 25 facing the space 24 is configured to further approach the bottom wall 22 with approaching the inside of the cabin. Thus, when the mount base 2 is attached to the flange 110 through the space 24, the tip end of the flange 110 is not easily hooked on the face 25a of the outer foam 25 facing the space 24. This can protect the outer foam 25 from damage.

The bottom foam 26 decreases in height from the inner face of the bottom wall 22 with approaching the inside of the cabin. Thus, when the seal lip 21a is warped, the tip end of the seal lip 21a does not easily interfere with the bottom foam 26, which can facilitate the attachment of the sealing member 1. Basically, the outer foam 25 and the bottom foam 26 are spaced from each other so that they do not come into contact with each other. Alternatively, as long as the ease of attachment to the flange 110 is not impaired, the outer foam 25 and the bottom foam 26 may be integrated with each other using a coating made of an elastic foaming material (not shown).

The embodiment described above is a mere example in every respect, and shall not be interpreted in a limited manner. Furthermore, any modification and change equivalent to the scope of claims fall within the scope of the present disclosure.

As can be seen in the foregoing, the automotive sealing member according to the present disclosure is applicable to an opening to be covered or uncovered with a door, for example.

What is claimed is:

1. An automotive sealing member comprising: a mount base to be attached to a flange formed along a perimeter of an opening provided for a body of an automobile, the sealing member sealing a gap between the perimeter of the opening and an opening/closing member for covering or uncovering the opening, wherein
    the mount base includes an outer wall to be arranged further toward the outside of a cabin than the flange, an inner wall to be arranged further toward the inside of the cabin than the flange, and a bottom wall connecting the outer and inner walls together, an end of the outer wall and an end of the inner wall, which are opposite to the bottom wall, forming a space therebetween which is open to allow the mount base to be attached to the flange through a tip end of the flange,
    a protrusion and an outer foam are provided for an inner face of the outer wall facing the inside of the mount base, the protrusion coming into contact with an exterior face of the flange facing the outside of the cabin, the outer foam being made of an elastic foaming material and coming into contact with the exterior face of the flange,
    a flexible seal lip is provided for an inner face of the inner wall facing the inside of the mount base, the flexible seal lip extending toward the outer wall, further approaching the bottom wall as it goes toward a tip end thereof, and coming into contact with an interior face of the flange facing the inside of the cabin,
    a bottom foam is provided for an inner face of the bottom wall facing the inside of the mount base, the bottom foam being made of an elastic foaming material, being spaced from the outer foam toward the inside of the cabin, and bulging toward the space, and
    a distance between the outer foam and the bottom foam in a width direction of the automobile is smaller than a thickness of a thinnest portion of the flange.

2. The automotive sealing member of claim 1, wherein the outer foam is arranged closer to the bottom wall than the protrusion on the inner face of the outer wall and the tip end of the seal lip which has been warped through the attachment of the mount base to a thickest portion of the flange.

3. The automotive sealing member of claim 1, wherein the outer foam is arranged closer to a base end of the flange than to the tip end of the flange to which the mount base has been attached.

4. The automotive sealing member of claim 1, wherein an outer end of the bottom foam toward the outside of the cabin is positioned further toward the outside of the cabin than the interior face of the flange.

5. The automotive sealing member of claim 1, wherein a face of the outer foam toward the space is configured to further approach the bottom wall with approaching the inside of the cabin.

6. The automotive sealing member of claim 1, wherein the bottom foam decreases in height from the inner face of the bottom wall with approaching from an intermediate vertex of the bottom foam in the width direction of the automobile to the inside of the cabin.

* * * * *